(No Model.)
J. C. SLAUGHTER.
Force Feed Device for Grain Drill.
No. 232,373. Patented Sept. 21, 1880.
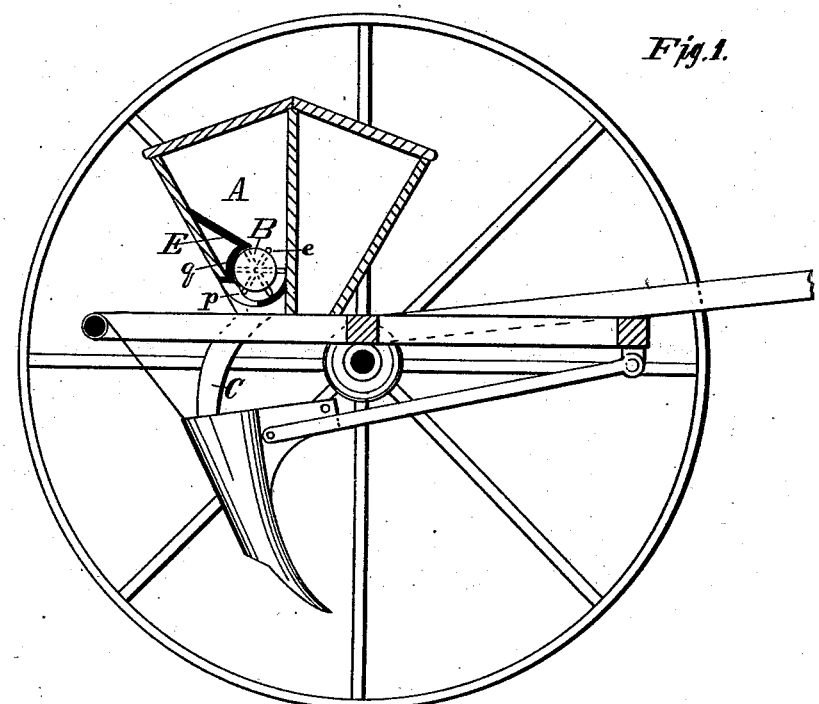
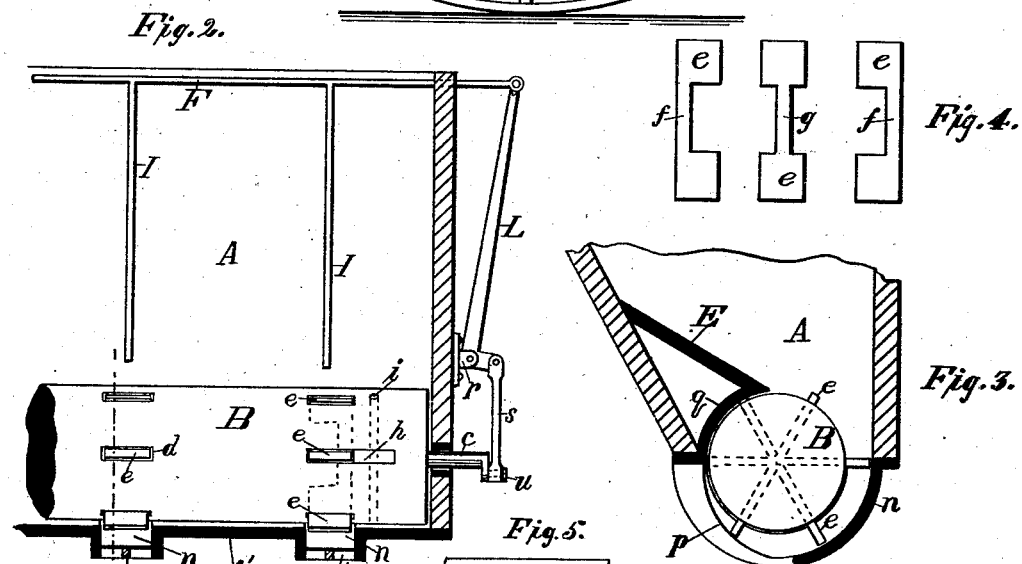
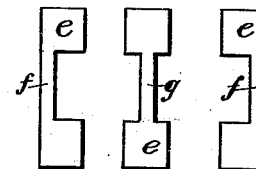
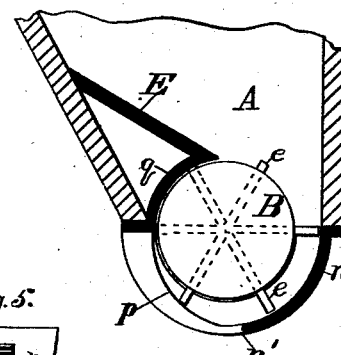
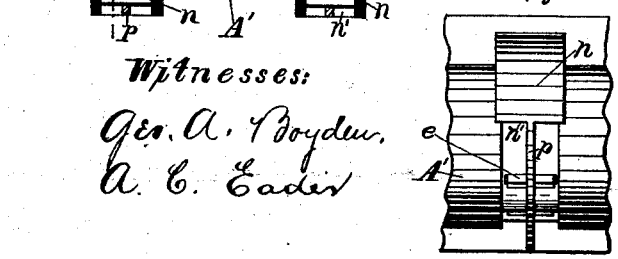
Witnesses:
Geo. A. Boyden,
A. C. Eader
Inventor:
Joel C. Slaughter
By his Atty
Chas. B. Mann

UNITED STATES PATENT OFFICE.

JOEL C. SLAUGHTER, OF CHESTERTOWN, MARYLAND, ASSIGNOR OF ONE-HALF OF HIS RIGHT TO JOHN W. HINES, OF SAME PLACE.

FORCE-FEED DEVICE FOR GRAIN-DRILLS.

SPECIFICATION forming part of Letters Patent No. 232,373, dated September 21, 1880.

Application filed March 29, 1880. (No model.)

*To all whom it may concern:*

Be it known that I, JOEL C. SLAUGHTER, of Chestertown, in the county of Kent and State of Maryland, have invented a new and useful Improvement in Force-Feed Devices for Fertilizer-Drills, of which the following is a specification.

My invention relates to an improved force-feed device for fertilizers, to be used in connection with grain-drills.

The construction of the device will first be described, and the claims will designate in what my invention consists.

In the accompanying drawings, Figure 1 is a section view of a drill with my attachment. Fig. 2 is a transverse section of the force-feed device. Fig. 3 is a section of the same as shown in Fig. 1, but on same scale as Fig. 2. Fig. 4 shows separately the feed-blades. Fig. 5 is a bottom view of the hopper and feed-trough outlet.

The letter A designates the box to contain the fertilizer. A shaft, B, extends lengthwise of the box in the rounding hopper-bottom A', and its ends have journals $c$ supported in bearings in the end of the box or frame. The shaft has three transverse mortises or slots, $d$, extending entirely through it and intersecting each other, so as to make, as it were, radial mortises, six in number, all joining at the center, in manner similar to the spoke-mortises in the hub of a wheel.

The letter $e$ designates the force-feed blades, which are adapted to move endwise in the mortises. Two of these blades are cut away on one side at the central part, as shown in Fig. 4, so as to leave a part, $f$, of about one-third the full width, and one of them is cut away in similar manner on both sides, leaving a central part, $g$, of about one-third the full width. The last-mentioned blade is inserted in one of the mortises, which is exactly of width to receive it, and one of the other two blades is inserted in each of the other mortises, both of which are of such greater width than the blade as to permit it to enter and pass the part $g$ of the blade first inserted, when it may be moved laterally, so as to bring the part $g$ of the one and the part $f$ of the two blades crosswise of each other. When in this position they are secured by a wedge or key, $h$, entered in each of the wider mortises, and retained there by a screw or pin, $i$, entering transversely.

The blades may be secured by means of iron sockets adapted for the blades to work in. A flange at each end of the socket will serve to secure it on the shaft.

Instead of three blades, a greater number may be used—as, for instance, four or five.

It will be seen this construction permits each blade to slide endwise back and forth in the mortise independently of the others.

A curved trough or chute, $n$, opens on one side of the bottom of the box, and is of width and depth to allow the blades to pass through when they project to their greatest extent. The curve of the bottom of the trough forms part of a circle of which the shaft B has a common center, and the bottom terminates at $n'$, at which point the fertilizer is discharged into the drill-tube C. From the point $n'$ to the side of the box opposite that where the trough or chute opens a curved plate, $p$, is secured with its curved edge uppermost, and said curved edge, at its point of joinder to the bottom of the trough $n$, is coincident with the said bottom; but the other end of the curved plate is placed so that the shaft B will just clear it. The curved plate forces the blades through the mortises in the shaft.

Above the upper end of the curved plate a guide-board, E, is placed, the upper part of which slants so as to guide the fertilizer material from the side of the box onto the feed-shaft, and the lower part of the guide is concaved, as shown at $q$, to conform to the rounding of the shaft, the concave serving to keep the blades $e$ projected into the trough or chute $n$.

By the construction above described the fertilizer material is forced by the blades into the troughs or chutes, and then forced through the trough, so that a given quantity is fed to the drill-tube by each blade.

The letter F designates a rod extending across from one end of the box to the other. From this rod, at suitable intervals, a stirrer-rod, I, depends, the same being rigidly attached to the rod F. A reciprocating motion is given to the horizontal rod by the bell-crank lever L, which is pivoted by a suitable brace, r, to the end of the box; and to the short arm of the bell-crank lever motion is imparted by a rod, s, which is attached to a crank-pin, u, on the projecting end of the shaft B. By the rotation of the shaft the rods I are made to move back and forth, thus keeping the fertilizer stirred.

It will be understood the shaft B is to be put in motion by suitable gear-wheels attached at the end, and the quantity of fertilizer to be sowed per acre may be regulated by the speed or motion of the shaft.

I am aware that grain-drills have heretofore been made in which were embodied a distributing wheel or disk having extensible blades, plungers, or followers projected by means of an eccentric or cam around the shaft on which the wheel or disk rotated. I do not therefore claim a rotary shaft or wheel having movable feed-blades without regard to their construction and operation.

In my device the feed-blades are operated by the projecting end of the blade passing upon the curved plate p, which is placed below the shaft and at the point where the fertilizer discharges from the chute.

Having described my invention, I claim and desire to secure by Letters Patent of the United States—

In a force-feed device for drills, the combination, with a rotary shaft or cylinder carrying feed-blades adapted to move in transverse mortises passing through the cylinder, of a curved plate, p, below the cylinder, with the curve eccentric to the axis of the cylinder, and adapted to act upon the end of the blades, as set forth.

JOEL C. SLAUGHTER.

Witnesses:
C. W. C. JOHNSON,
A. J. DUGAN.